United States Patent [19]
Hoover

[11] Patent Number: 5,442,972
[45] Date of Patent: Aug. 22, 1995

[54] VARIABLE RATIO BICYCLE DRIVE MECHANISM

[76] Inventor: Irvin Hoover, 5691-30th Avenue N.W., Salmon Arm, British Columiba, Canada, V1E 4M2

[21] Appl. No.: 88,138

[22] Filed: Jul. 7, 1993

[51] Int. Cl.⁶ .............................................. B62M 3/06
[52] U.S. Cl. ..................................... 74/65; 74/594.3; 280/262; 280/288.1
[58] Field of Search ............... 74/594.3, 67, 65, 594.1, 74/594.2; 280/252, 256, 257, 262, 288.1

[56] References Cited

U.S. PATENT DOCUMENTS

| | | | |
|---|---|---|---|
| 96,208 | 10/1869 | Dayton | 280/256 |
| 310,998 | 1/1885 | Hennig | 280/256 |
| 5,290,054 | 1/1994 | Po | 280/288.1 |

FOREIGN PATENT DOCUMENTS

| | | | |
|---|---|---|---|
| 703122 | 4/1931 | France | 74/594.3 |
| 726483 | 5/1932 | France | 74/594.3 |
| 783664 | 7/1935 | France | 280/257 |
| 357837 | 7/1938 | Italy | 280/288.1 |
| 12482 | of 1890 | United Kingdom | 74/594.3 |
| 1968 | of 1893 | United Kingdom | 74/594.3 |
| 1896 | of 1896 | United Kingdom | 74/594.3 |
| 21508 | of 1902 | United Kingdom | 280/262 |

*Primary Examiner*—Charles A. Marmor
*Assistant Examiner*—Nathan O. Jensen
*Attorney, Agent, or Firm*—Oyen, Wiggs, Green & Mutala

[57] ABSTRACT

A variable ratio bicycle drive mechanism has particular advantages for use in the drive train of an off-road bicycle but has application in human powered vehicles generally. The mechanism provides a mechanical advantage which varies with the position of the pedals. The angle between the left and right pedals is not fixed at 180° but varies as the pedals rotate so that one pedal enters the most efficient part of its cycle before the other pedal has finished the most efficient pad of its cycle. The mechanism can help to improve the balance of a rider and even out the delivery of power by the rider to the bicycle. The mechanism has a driving axle rotatably mounted in a frame and a pair of pedal axles, one for each foot, mounted parallel to and spaced apart from the driving axle. The pedal axles are driven by the rider by means of linkages, which may be conventional pedals mounted at the ends of crank arms connected to the outer ends of the pedal axles. The pedal axles are each connected to the driving axle by means of an arm which extends radially away from the driving axle, an arm extending radially away from the driven axle, and a connecting link having one end pivotally connected each arm. In an alternative embodiment of the invention, the arms connected to the driving axle are telescopic and no connecting links are required.

29 Claims, 12 Drawing Sheets

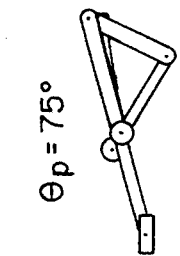
FIG. 7D  $\theta_p = 75°$
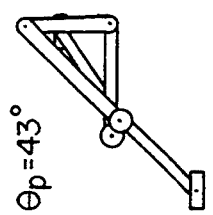
FIG. 7C  $\theta_p = 43°$
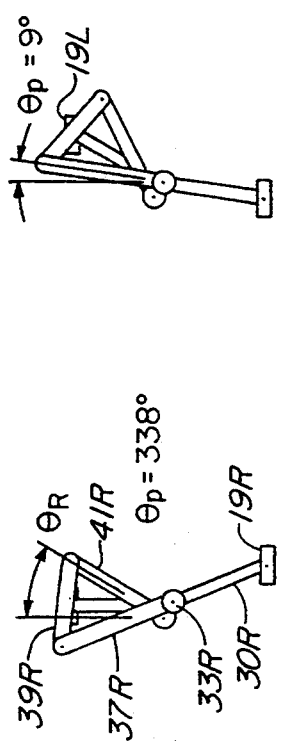
FIG. 7B  $\theta_p = 9°$  19L
FIG. 7A  $\theta_R$  41R  $\theta_p = 338°$  19R  39R  37R  33R  30R
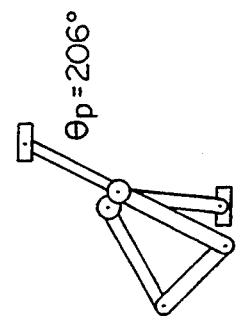
FIG. 7H  $\theta_p = 206°$
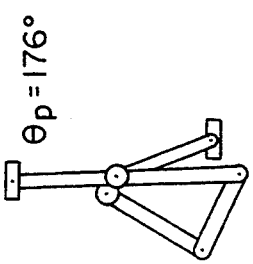
FIG. 7G  $\theta_p = 176°$
FIG. 7F  $\theta_p = 143°$
FIG. 7E  $\theta_p = 110°$
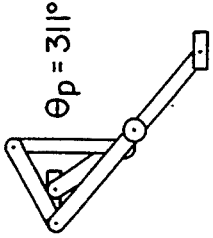
FIG. 7L  $\theta_p = 311°$
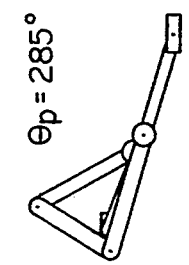
FIG. 7K  $\theta_p = 285°$
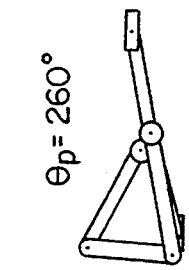
FIG. 7J  $\theta_p = 260°$
FIG. 7I  $\theta_p = 234°$

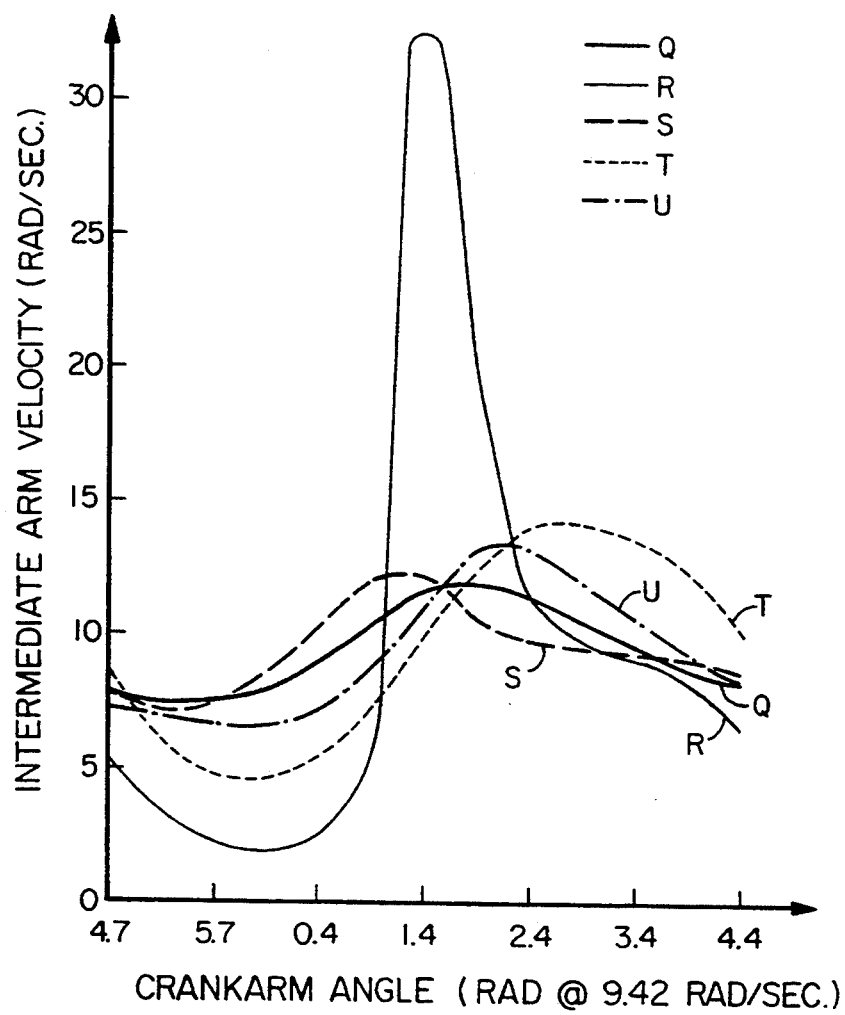
FIG. 11
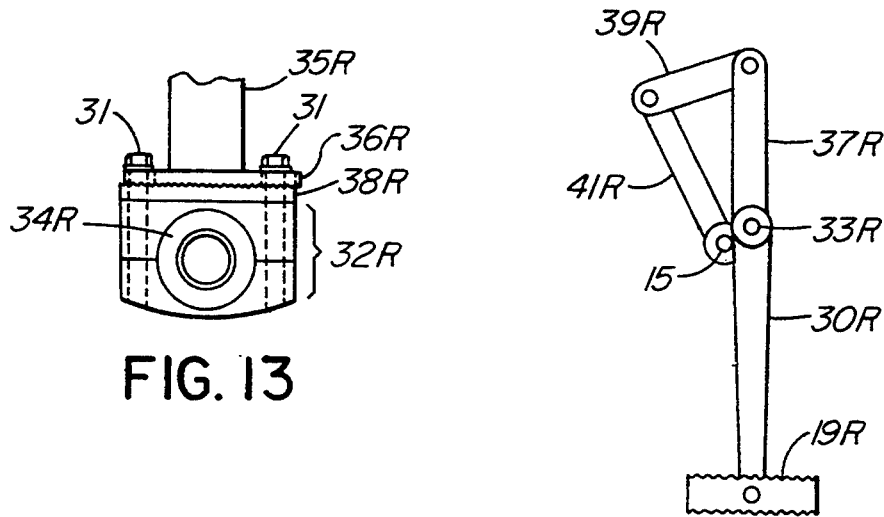
FIG. 13
FIG. 14

VARIABLE RATIO BICYCLE DRIVE MECHANISM

FIELD OF THE INVENTION

This invention relates to a mechanism for converting human energy into rotational motion. The mechanism may be applied in the drive train of a bicycle or other human-powered vehicle.

BACKGROUND OF THE INVENTION

A standard bicycle drive train comprises a driving axle journalled for rotation in the frame of a bicycle. A crank arm is mounted at each end of the driving axle. The two crank arms extend at right angles to the driving axle, in opposite directions. A pedal extends outwardly from the end of each crank arm. A rider pedals the bicycle with his or her feet to cause the driving axle to rotate about its axis. The pedals traverse circular trajectories about the driving axle with the sense of rotation such that each pedal is travelling toward the front of the bicycle when it is at the top of its path. The rear wheel of the bicycle is driven by a roller chain which passes around a drive sprocket mounted to the driving axle and around a driven sprocket connected to the rear wheel of the bicycle.

The standard bicycle drive train is simple and reasonably effective. Because bicycles are relatively inexpensive, and widely available, and because a bicycle drive train harnesses the leg muscles which are among the strongest muscles in the human body, bicycle-type drive trains are used in various applications. For example, bicycle-type drive trains may be used to power water pumps, to drive small generators, or to provide a source of mechanical power for operating various types of machinery in places where electrical power is not readily available.

There are several problems with standard bicycle drive trains. One problem is that a bicycle drive train, as described above, is not well matched to the capabilities of the human body. In a standard bicycle drive-train, the maximum torque which a rider can deliver varies with the angular position of the bicycle pedals. The result is a pulsating flow of power to the driven sprocket. This is especially true at low rates of rotation and high torque load such as may occur when a bicycle is being ridden up a hill. Ideally, constant torque would be applied to the driven sprocket for on-road use. In off-road conditions a moderate level of pulsation can improve tire grip.

Each revolution of a bicycle pedal can be divided roughly into four phases. First, the rider kicks forward when the pedal is between the ten o'clock position and the one o'clock position. Second, the rider pushes downward as the pedal moves from the one o'clock position to the five o'clock position. This second portion of the cycle is termed the "power stroke". Third, the rider drags or paws the pedal from the five o'clock position to the seven o'clock position. Finally, the rider lifts his or her foot as the pedal moves from its seven o'clock position back to its ten o'clock position. Due to the skeletal structure and arrangement of muscle groups in a typical human body, the power stroke is the most powerful and efficient stroke. The combined kicking and dragging motions of both legs generate substantially less torque. The lifting motion is relatively ineffective at generating power. However, this is compensated for by the fact that while one leg is being lifted the other pedal is in its power stroke. The forces which a rider is capable of exerting on the pedals also depend upon the position of the rider's legs and body relative to the pedals.

A rider is generally able to exert a maximum torque on the driving axle during the portion of the power stroke when one of the two crank arms is extended horizontally in front of the driving axle (i.e. when the crank arm is in its "3 o'clock" position which is 90° clockwise from the pedal's top dead centre position when viewed from the right-hand side of the bicycle). At this point the rider is able to apply his or her full weight in a direction perpendicular to the crank arm and is able to create more torque about the driving axle than is possible when the crank arm is in other positions.

The torque which the rider can deliver to the driving axle is the sum of the torques about the axle which result from the forces exerted by the rider on each of the two pedals. As a result, when a rider is attempting to maximize the energy delivered to the rear wheel of the bicycle, the torque on the driving axle rises and falls twice during each rotation of the pedals. This causes the bicycle to accelerate and decelerate. The slight increase in speed resulting from each power pulse is generally wasted to wind drag and rolling friction during the slack period when the rider is generating a reduced amount of torque.

A second problem with a standard bicycle drive-train is its tendency to stall at low rates of rotation and high torque loads. When one crank arm points vertically downward, the opposite side crank arm points vertically upward. In this configuration it is difficult for the rider to start the pedals moving or to accelerate the rotation of the pedals because neither pedal is in a position which allows the rider to apply much torque to the driving axle.

A third problem which is inherent in the construction of a standard bicycle drive train is that when a rider is attempting to exert maximum torque on the bicycle's drive-train the rider tends to bob up and down and from side to side as he or she alternately applies force to the left and right pedals of the bicycle. This tends to keep the rider slightly off balance.

A fourth problem with a standard bicycle drive train is that the rider is forced to shift his or her weight slightly forward and rearward twice during each full rotation of the pedals. When the rider is standing and attempting to apply maximum torque to a standard bicycle drive train, as one pedal passes 90°, virtually all of the rider's weight is on that forward pedal. If the rider is balanced, the rider's centre of gravity is above the forward pedal. When the crank arms are both vertical, as happens twice during each full rotation of the pedals, the rider's centre of gravity is directly above the driving axle. Therefore, the rider's centre of gravity moves fore and aft a distance equivalent to the length of one of the crank arms twice during each full rotation of the pedals. This unnecessary motion can put the rider off balance and can result in the rider wasting energy.

A fifth problem with a standard bicycle drive train is that at any given time, only one of the rider's two legs is in the power stroke portion of its cycle. Assuming that the pedals rotate at a constant rate, each of the two crank arms spends, on average, only about one third of each cycle in the power stroke portion of its cycle. Each of the rider's legs spends the majority of each cycle in a position where it is not capable of applying a significant amount of torque about the driving axle.

A sixth problem which can occur with a standard bicycle drive train is that the rider can tend to "bounce". This happens because the geometry of a standard bicycle drive train is such that the rider's left leg may not reach its highest point at exactly the same time as the rider's right leg is at its lowest point and vice versa. The rider's upper legs pivot up and down at the rider's hips as the rider pedals. When the rider's right leg is at its lowermost position (i.e. if the bicycle is properly fitted to the rider when the right pedal is near its bottom dead centre position) the rider's left leg has not yet reached its highest point. Because of the geometry of the human body, the rider's left knee is typically not fully raised until after the left pedal is approximately 15° past its top dead centre position. This asymmetry causes a net upward force on the rider's torso twice in each full revolution of the bicycle's pedals. At high rates of pedal rotation the bounce can be bad enough to make it hard for the rider to remain firmly seated on the bicycle.

Various prior art mechanisms have been proposed to enable a human rider to deliver constant torque to a bicycle drive system throughout a complete revolution of the bicycle pedals. Such systems include those described in Yamaguchi U.S. Pat. No. 4,560,182; Vereyken U.S. Pat. No. 4,577,879; Trammell Jr., U.S. Pat. Nos. 4,029,334, 3,779,099, 3,906,807; Cropek U.S. Pat. No. 4,898,047; Pontin, U.S. Pat. No. 3,132,877 and Phillips U.S. Pat. No. RE11,331; and, the BIOPACE™ system manufactured by Shimano American Corporation of Irvine, Calif. The BIOPACE™ system provides a mechanical advantage which varies with the position of the bicycle pedals by using an oval shaped drive sprocket.

SUMMARY OF THE INVENTION

The invention provides a drive mechanism for imparting rotational motion to a drive axle rotatably coupled to a frame. The mechanism is characterized by right and left axles rotatably coupled to the frame parallel to the drive axle; right and left pedal arms connected transversely to the right and left axles respectively; right and left intermediate arms connected transversely to the right and left axles respectively, at an angle $\phi$ relative to the right and left pedal arms respectively; and right and left linkage means connected between the intermediate arms and the drive axle.

In one aspect of the invention, the left and right linkage means comprise right and left crank arms connected transversely to the drive axle; and, right and left connecting links pivotally connected between the respective intermediate arms and crank arms.

In another aspect of the invention, the left and right linkage means comprise right and left telescopic crank arms connected transversely to the drive axle and pivotally connected to the respective intermediate arms.

Another aspect of the invention provides a drive mechanism comprising left and right lever arms pivotally mounted to the frame for swinging forward and rearward relative to the frame, left and right foot pedals connected to the left and right lever arms at points spaced apart from the frame and left and right connecting arms pivotally connected between the left and right lever arms and the left and right pedal arms.

Another aspect of the invention provides a drive mechanism comprising left and right lever arms having first ends coupled to the frame at points behind the driving axle and left and right foot pedals extending outwardly from second ends of the left and right lever arms. The left and right lever arms are pivotally connected to the left and right pedal arms respectively at points between the first and second ends of the left and right lever arms.

The invention also provides a drive mechanism for deriving rotational motion from human power. The drive mechanism comprises: a frame having a forward end, a rearward end, an upper side a lower side, a left side and a right side; a first transverse driving axle having an axis, a left end and a right end journalled for rotation in said frame; a left crank arm connected to and extending radially away from said left end of said first axle; a right crank arm connected to and extending radially away from said right end of said first axle in a direction opposite to said left crank arm; left and right axles each having a left end, a right end and an axis, and each being journalled for rotation relative to said frame and spaced apart from said first axle; a left intermediate arm connected to and extending radially from said right end of said left axle; a right intermediate arm connected to and extending radially from said left end of said right axle; a left connecting link pivotally attached to said left crank arm at a point spaced apart from said first axle and pivotally attached to said left intermediate arm at a point spaced apart from said left axle; a right connecting link pivotally attached to said right crank arm at a point spaced apart from said first axle and pivotally attached to said right intermediate arm at a point spaced apart from said right axle; a left pedal arm connected to and extending radially from said left end of said left axle; and a right pedal arm connected to and extending radially from said right end of said right axle.

BRIEF DESCRIPTION OF THE DRAWINGS

Preferred embodiments of the invention will now be described with reference to the following drawings in which:

FIGS. 7A through 7L are schematic views of the right-hand side portion of the drive system of the bicycle of FIG. 4 at various points throughout a complete cycle;

FIG. 11 is a graph showing the relationship between pedal speed and crank arm angle for drive mechanisms of various configurations;

FIG. 13 is a side elevation of an alternative outrigger member which provides means for adjusting the position of a pedal crank axle relative to the frame of a bicycle.

FIG. 14 is a side elevation of the right-hand side portion of an alternative construction for a drive system according to the invention;

DETAILED DESCRIPTION OF THE PREFERRED EMBODIMENT

Figure 1:
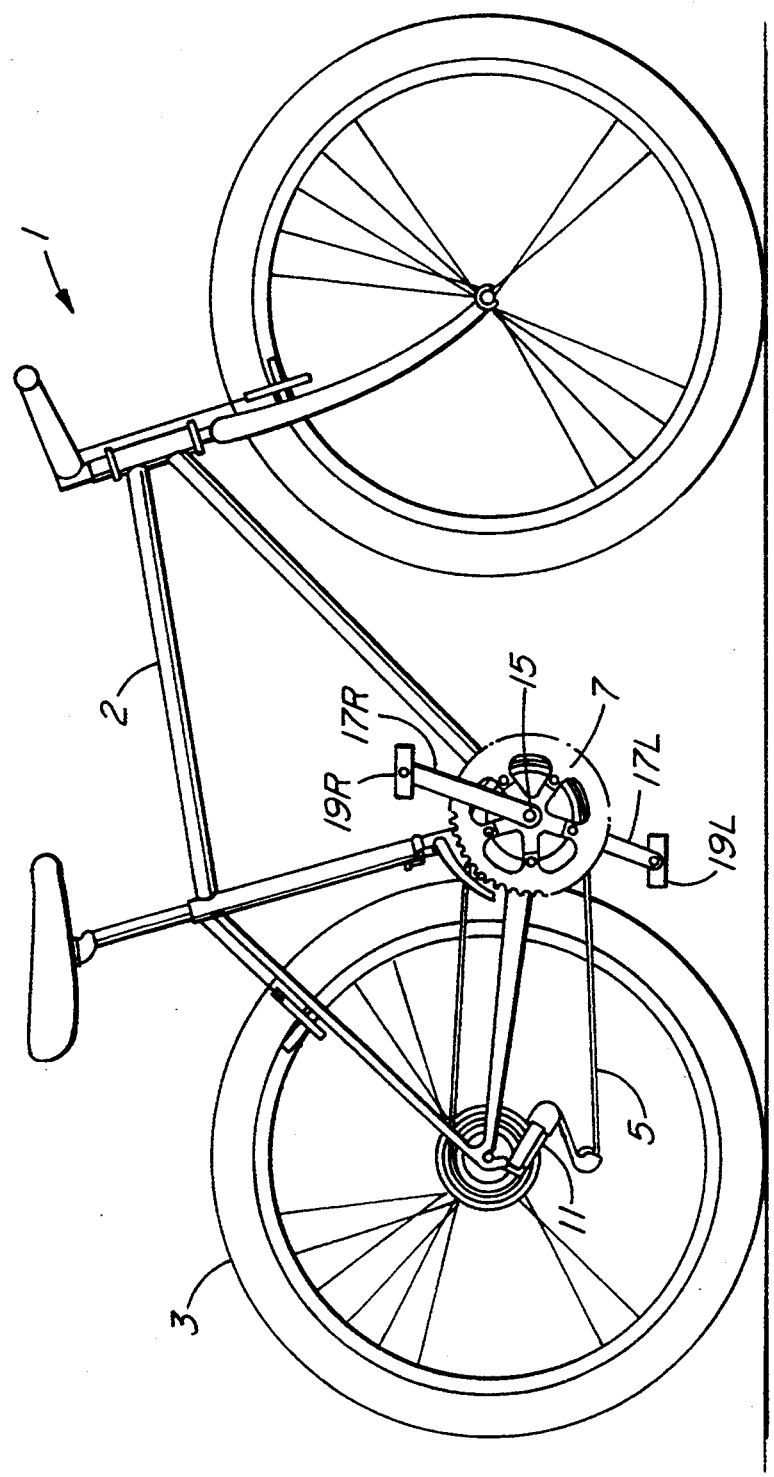
FIG. 1 is a side elevation of a bicycle having a standard prior-art drive train.

FIG. 1 shows a standard bicycle drive system. Rear wheel 3 of bicycle 1 is driven by a chain 5 which passes around drive sprocket 1 and rear cluster 9. Rear cluster 9 comprises several sprockets of stepped diameters. Derailleur 11 allows the rider to select one of several drive train gear ratios by moving chain 5 from one sprocket of rear cluster 9 to another.

Sprocket 7 is mounted to axle 15 which is journalled for rotation in frame 2 of bicycle 1. Crank arms 17R, 17L extend radially away from each end of axle 1,5. Crank arm 17P, extends in a direction 180° opposite to crank arm 17L to form a crank. Pedal assemblies 19P, 19L are affixed at the ends of arms 17R, 17L respectively.

The bicycle rider propels the bicycle by alternately applying force to pedals 19R, 19L so that sprocket 7 rotates in a clock-wise direction as viewed from the right-hand side of bicycle 1.

Figure 2:
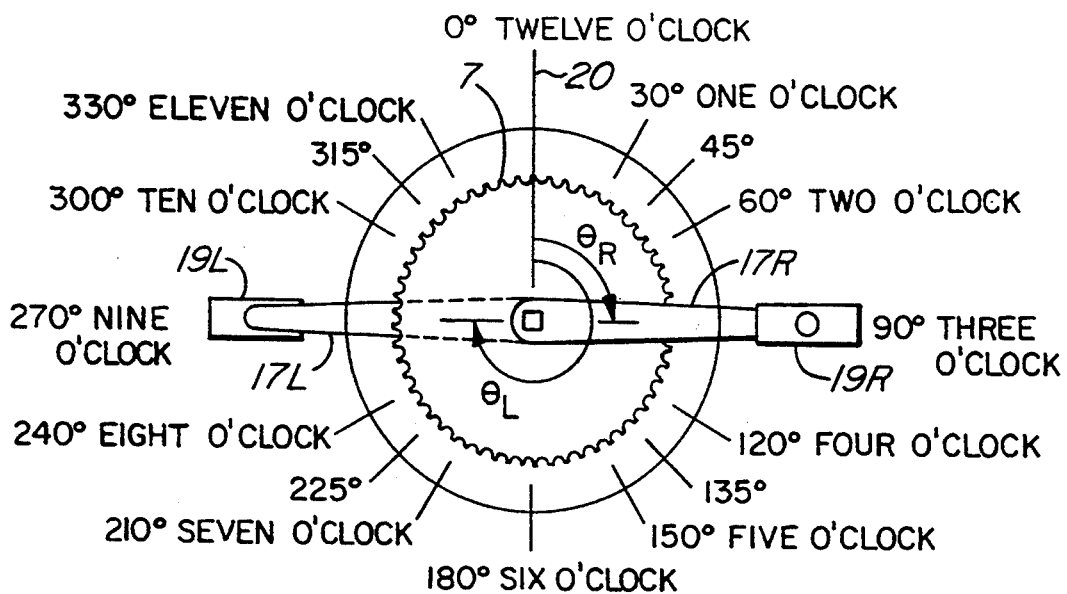
FIG. 2 is a schematic diagram illustrating the convention used in this disclosure for measuring the angle of the crank arms in a bicycle drivetrain.

The angle of rotation of arms 17R, 17L may be measured relative to an arbitrary vertical line 20 which extends upwardly through the centre of axle 1,5 as shown in FIG. 2. In this disclosure, the angle of an arm which rotates about an axis is specified in degrees relative to a vertical line which passes upward through the axis unless otherwise specified. In FIG. 2, arm 17R is at an angle, $\theta_R$, of 90° relative to reference line 20 and arm 17L is at an angle, $\theta_L$, of 270° relative to reference line 20. FIG. 2 also illustrates how angles can be identified in 30° increments as the points on a clock face. For example, In FIG. 2, arm 17R is in its 3 o'clock position and arm 17L is in its 9 o'clock position. In a standard bicycle drive train, the angle between arms 17R and 17L is always 180°.

A difficulty with the standard bicycle drive system shown in FIG. 1 is that it is almost impossible for the rider to apply a uniform torque about axle 15 by applying forces to pedals 19R, 19L. The rider can apply a maximum amount of torque about axle 15 through one of pedals 19R, 19L only when that pedal's corresponding arm, 17R, 17L is at an angle of approximately 90° with respect to reference line 20.

Figure 3:
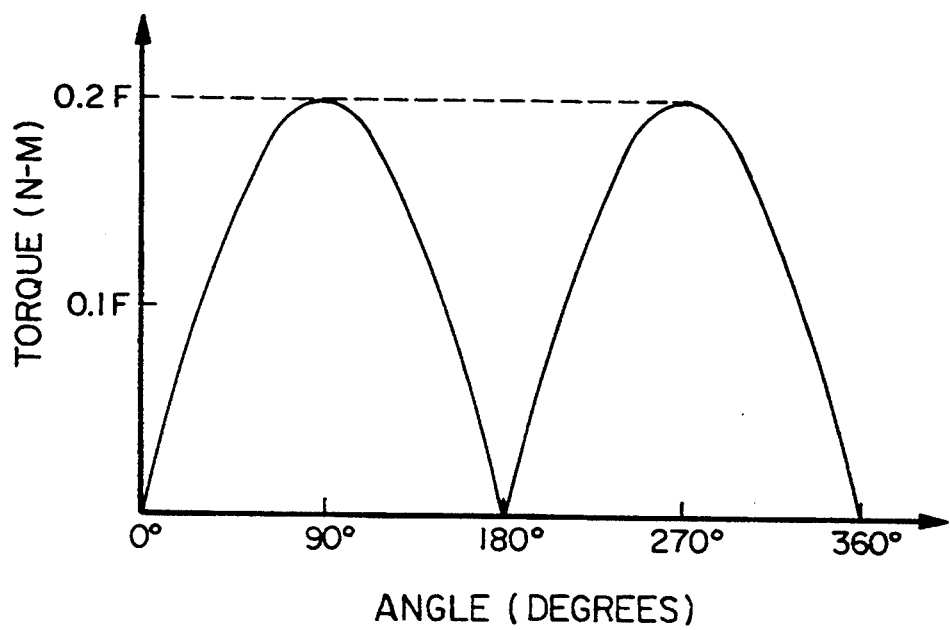
FIG. 3 is a graph showing the relationship between driving axle torque and pedal angle for the prior art bicycle drive train shown in FIG. 1.

FIG. 3 is a graph which shows the variation of torque about axle 15 as a function of the angle of arm 17R throughout a full cycle. FIG. 3 is based upon the assumption that the rider applies a constant force, F, vertically downward on each of pedals 19R, 19L when that pedal is at an angle between 0° and 180° and applies no force at all to the pedal when it is at an angle between 180° and 360° with respect to reference line 20. In FIG. 3, the length of crank arms 17R, 17L is taken as being 0.2 m.

The assumptions made to generate FIG. 3 do not precisely reflect real world conditions because the downward forces exerted by a rider on the pedals of a bicycle are not constant and the forces applied by a rider to the pedals of a bicycle are not always directed vertically downward. However, FIG. 3 does demonstrate the gross features of the way in which torque produced by a bicycle rider varies as the rider pedals through a full cycle. For example, FIG. 3 correctly shows that when arm 17R is at an angle of 0° or 180° it is very difficult for the rider to apply a significant amount of torque about axle 15 and that the rider is able to exert maximum torque about axle 15 when one of arms 17R, 17L is at an angle between approximately 30° and 150°.

Figure 4:
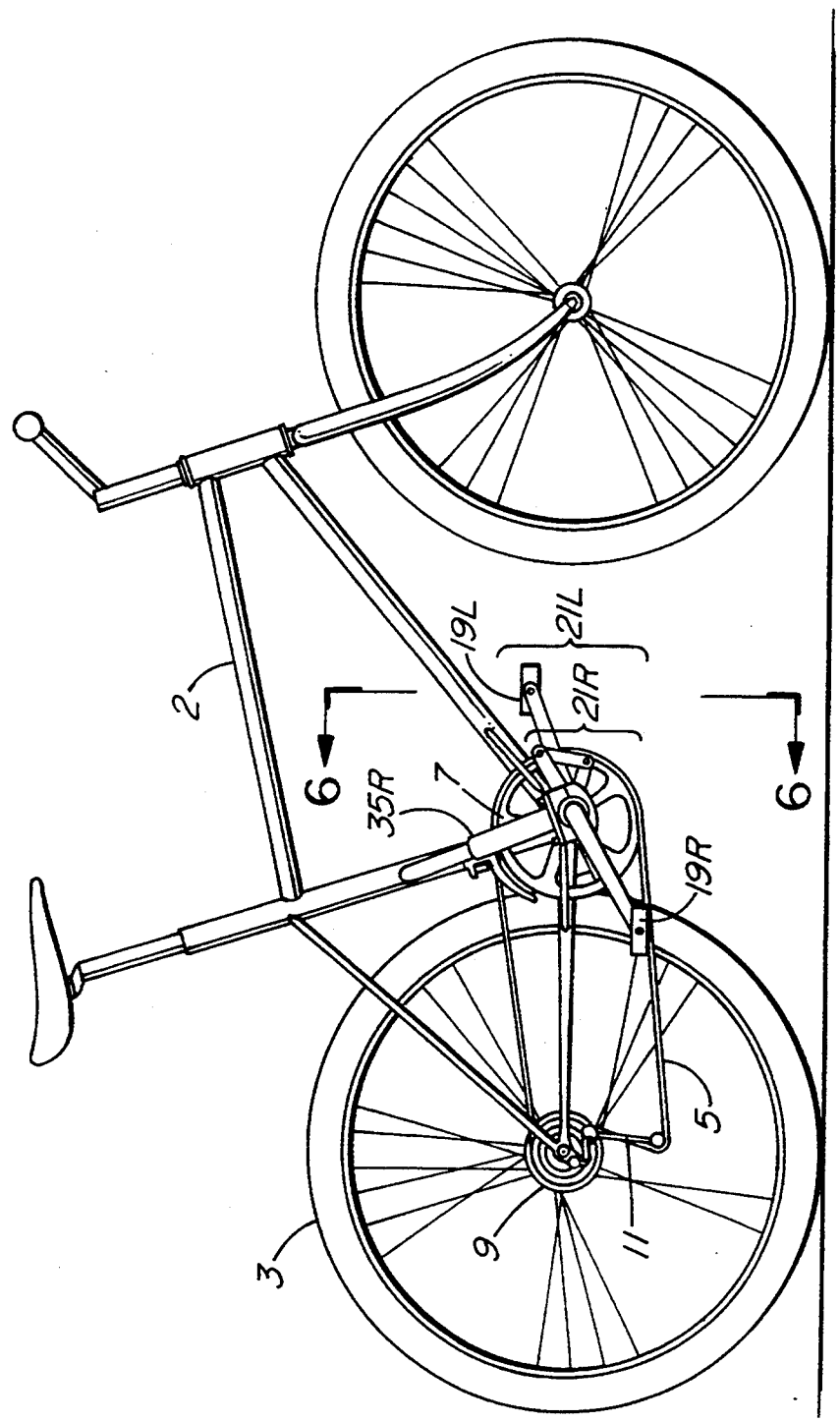
FIG. 4 is a side elevation of a bicycle with an improved drive system according to the invention.

FIG. 4 shows a bicycle with an improved drive system according to the invention. The invention does not affect the operation of sprocket 7, axle 15, chain 5 or rear cluster 9. It does, however, affect the way in which a rider causes sprocket 7 to rotate. As shown in FIG. 4, pedal 19R is connected to axle 15 through a mechanism 21R. Pedal 19L is connected to axle 15 through a second mechanism 21L.

Mechanism 21L, which is preferably a mirror image of mechanism 21R, is provided on the left-hand side of the bicycle for operation by the left leg of the rider. The pads of mechanism 21L have reference numerals corresponding to those of the pads of mechanism 21R but with the suffix "L" instead of the suffix "R". Because crank arm 41L is 180° away from crank arm 41R, mechanism 21L operates 180° out of phase from mechanism 21R. In some circumstances a rider may prefer to have slight asymmetries between mechanisms 21R and 21L to compensate for physical asymmetries, such as one leg being shorter or weaker than the other leg.

Figure 5:
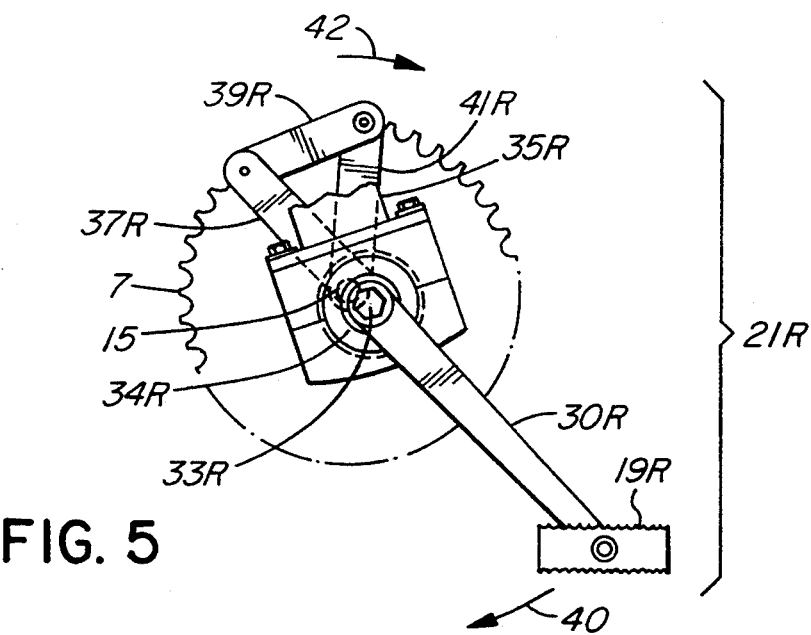
FIG. 5 is a partially cut-away side elevation of the right-hand side portion of the improved drive system of the bicycle of FIG. 4.
Figure 6:
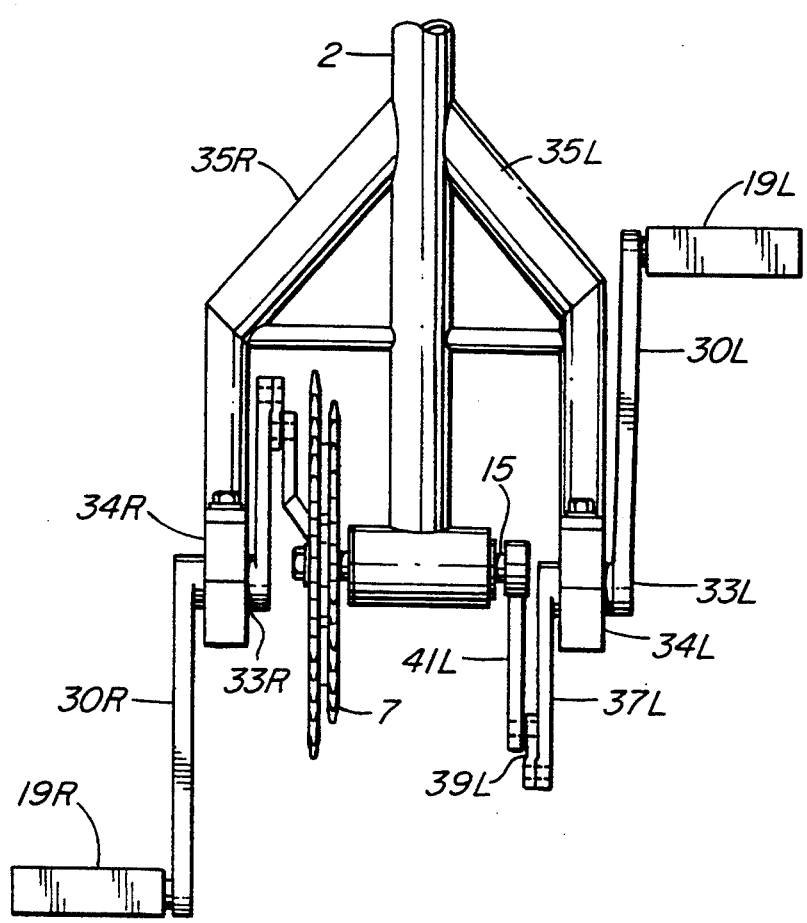
FIG. 6 is a partially cut away front view of the pedal portion of the bicycle of FIG. 4.

FIG. 5 is a detailed view of mechanism 21R. Pedal 19R is mounted at one end of a pedal arm 30R. The opposite end of pedal arm 30R is attached to an axle 33R which is journalled for rotation in bearing 34R. As shown in FIG. 6, bearing 34R is mounted in an outrigger extension 35R of frame 2. Intermediate arm 37R is also connected to axle 33R and, as discussed below, preferably projects radially away from axle 33R in a direction opposite to pedal arm 30R. The end of intermediate arm 37R away from axle 33R is pivotally connected to one end of connecting link 39R. The opposite end of connecting link 39R is, in turn, pivotally connected to crank arm 41R which projects radially outward from the righthand end of axle 15.

Axle 33R constitutes a right axle rotatably coupled to frame 2. Axle 33L constitutes a left axle rotatably coupled to frame 2. Arms 41R and 41L are crank arms connected to axle 15. Pedal arms 30R and 30L and pedals 19R, 19L constitute coupling means for applying a force delivered by a human limb to pedals 19R, 19L as a torque to axles 33R and 33L respectively.

Because pedal arm 30R and intermediate arm 37R are fixed to axle 33R, a force applied to the end of pedal arm 30R in the direction of arrow 40 causes intermediate arm 37R to apply a force to the end of connecting link 39R. This compresses connecting link 39R between intermediate arm 37R and crank arm 41R applying a force to the end of crank arm 41R. The force on the end of crank arm 41R causes a torque to be applied about axle 15 in the direction of arrow 42. If axle 15 is free to turn, rotation of pedal arm 30R in the direction of arrow 40 causes axle 15 to rotate in the direction of arrow 42.

FIG. 6 is a partially cut-away view of the bicycle of FIG. 4 looking at drive assemblies 21R, 21L from the front. From this angle it can be seen that axles 33R, 33L are mounted to frame 2 at the ends of outriggers 35R, 35L. It is important that outriggers 35R, 35L be strongly attached to frame 2 because of the considerable lateral forces that are delivered to axles 33R, 33L as the bicycle is pedalled.

FIGS. 7A through 7L show the configuration of assembly 21R as the angle of crank arm 41R is increased in 30° increments through a full rotation of axle 15. Several things can be noted about the behaviour of pedal arm 30R as axle 15 rotates at a constant rate. Firstly, pedal arm 30R does not rotate at a constant rate. Pedal arm 30R rotates more quickly when it is in the angular range of 180° to 360° relative to axle 33R than it does in the angular range of 0° to 180°. That is, if crank arm 41R rotates at a constant angular velocity, pedal arm 30R spends more time in the power portion of its stroke then it does on the return portion of its stroke. This can be seen by comparing the change in angle of pedal arm 30R between subsequent ones of FIGS. 7A through 7L. When pedal arm 30R is in the angular range of 0° to 180° as shown in FIGS. 7A and 7H through 7L, it moves in increments which are, on average, smaller than 30° for each 30° increment in the angle of crank arm 41R. When pedal arm 30R is in the angular range of 180° to 360° as shown in FIGS. 7B through 7G it moves in increments which are, on average, larger than 30° for each 30° increment in the angle of crank arm 41R.

Secondly, the mechanical advantage of assembly 21R varies continuously throughout a full cycle of pedal arm 30R. Mechanical advantage is defined as the ratio of output force to input force or, in the alternative, the ratio of input speed to output speed. For example, where pedal arm 30R traverses more than 30° when axle 15 rotates by 30° the mechanical advantage is greater than one. That is, the assembly behaves as if the rider were operating in a low gear. Conversely, when pedal arm 30R moves by less than 30° for a corresponding 30° rotation of axle 15, the mechanical advantage is less than one, as if the rider were pedalling in a higher gear.

Mechanisms 21R (and 21L) are preferably arranged so that the mechanical advantage of mechanism 21R (or 21L) is minimum at the position shown in FIG. 7D, when pedal arm 30R (or 30L) is in the power stroke portion of the cycle and maximum when pedal arm 30R (or 30L) is in its return portion of the cycle. This tends to even out the delivery of power from the rider to sprocket 7. Because mechanisms 21R and 21L cause pedals 19R and 19L to move more slowly during the power stroke portions of their cycles and more quickly during the return portions of their cycles, each of pedals 19R and 19L spends a higher proportion of its time positioned in the power stroke portion of its cycle than do the pedals in a standard bicycle drive train.

Another feature of the drive mechanism of the invention is that, because the rate of travel of the pedals vary with their position, the angle separating pedal arm 30R, which is driven by the rider's right foot, and pedal arm 30L, which is driven by the rider's left foot, is not a constant 180° as it is in the case of a standard bicycle drive train. Rather, the angle between pedal arm 30R, and pedal arm 30L varies during a complete cycle. The configuration of mechanisms 21R and 21L are preferably arranged so that the power strokes of the left and right pedals tend to overlap. That is, so that pedal 19R is beginning its power stroke before pedal 19L has finished its power stroke (see FIGS. 7G and 7H). This, in turn, has some positive effects on the balance of the rider, eliminates the stall position which occurs in a standard bicycle drive train when both crank arms are vertical, and reduces the stress on drive chain 5 and sprockets 7, 9. The latter effect is due to the lower applied torque at the 3 o'clock position and the more constant torque output provided by mechanisms 21R, 21L as compared to a standard bicycle drive train.

Figure 8:
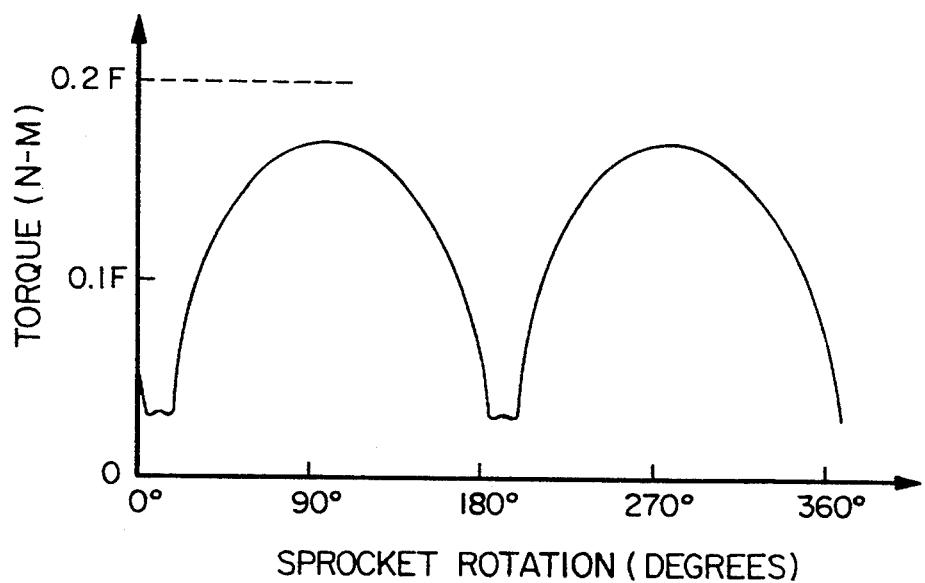
FIG. 8 is a graph showing the relationship between driving axle torque and crank arm angle for the drive train of the bicycle of FIG. 4.

During the power stroke, when the rider is able to exert the maximum force on pedal 19R, in a direction perpendicular to pedal arm 30R, the mechanical advantage is less than one so the maximum output torque is slightly reduced. As pedal 19R swings to the bottom of its stroke, the mechanical advantage begins to increase slightly. This tends to compensate for the fact that when pedal 19R is near the bottom of its circle of motion, the force exerted by the rider is generally not acting perpendicular to pedal arm 30R. As the pedal passes 180° the mechanical advantage increases further. Finally, when the pedal reaches and passes through 360° the mechanical advantage begins to decrease and the pedal slows down. The total torque applied to axle 15 by a rider is the sum of the torques applied by the rider's left foot and right foot. Because the power strokes of the left and right feet overlap somewhat the total torque applied to axle 15 by a rider is kept more nearly constant over a cycle than is the case in a standard bicycle drive assembly. FIG. 8 shows the variation in the torque on axle 15 with the angle of crank arm 41R over a complete rotation of axle 15. As shown in FIG. 8, the torque on axle 15 is more even than it is in a standard bicycle drive train. Because the tension in chain 5 is more nearly constant than it is with a standard bicycle drive train, the bobbing effect that occurs with particular severity in bicycles which are equipped with a suspension is reduced.

Preferably, the maximum mechanical advantage offered by mechanism 21R is approximately 1.5 times larger than the minimum mechanical advantage offered by mechanism 21R, although, ratios of 2.5:1 or more are possible. For example, when the forward pedal is in its position of minimum mechanical advantage, with its crank arm at an angle of approximately 90° the rearward pedal is preferably near it's position of maximum mechanical advantage at an angle of approximately 240°.

If the ratio of maximum mechanical advantage to minimum mechanical advantage is 2.5:1 then a 250 Newton ("N") downward force on the rearward pedal will balance a 625N downward force on the forward pedal. This can be contrasted with the situation in a standard bicycle where a 625N force would be required on the rearward pedal to balance a 625N force on the forward pedal. The result is, that when the rider is coasting and standing up with the pedals stationary and roughly horizontal, the rider's centre of gravity is somewhat forward from the position it would hold if the bicycle were equipped with a standard bicycle drive assembly. This can be advantageous during off-road riding where it can be useful to have the rider's centre of gravity point as far forward as possible.

Figure 9A:
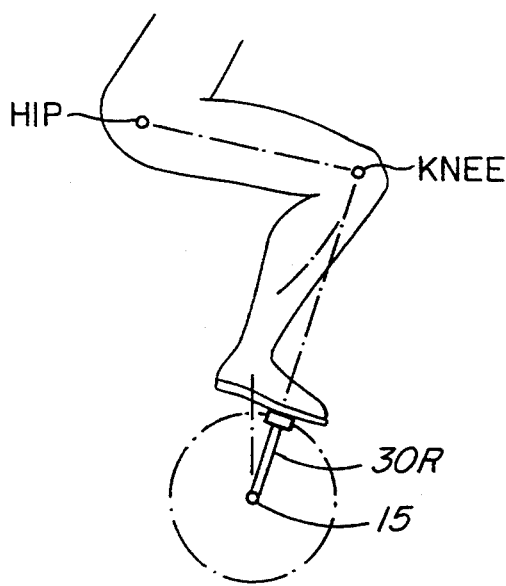
FIGS. 9A and B are schematic diagrams of a prior art bicycle drive system illustrating the points at which a rider's knee reaches its highest and lowest points.
Figure 9B:
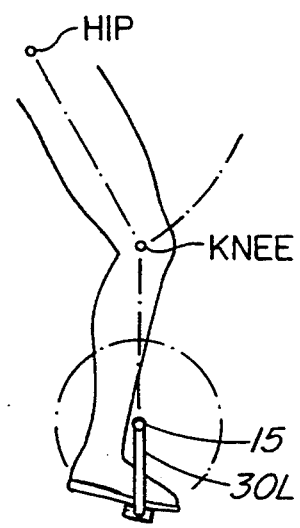

FIG. 9, is a schematic illustration of a rider seated on a standard bicycle. If the rider remains seated then the rider's upper legs oscillate up and down as the bicycle is pedalled with the rider's knees describing arcs centred on the rider's hips. The right knee of the rider shown in FIG. 9A does not reach the top of its arc until the right pedal is slightly past its top dead centre position. As shown in FIG. 9B, the rider's left knee reaches the bottom of its arc when the left pedal is at its bottom dead centre position. Because the left pedal reaches its bottom dead centre position at exactly the same time as the right pedal reaches its top dead centre position (and vice versa), the rider's right leg is still moving upward when the rider's left leg reaches the bottom of its trajectory and reverses its direction of motion. Because the rider's left and right knees may not reverse direction simultaneously a reaction force may be created at the rider's hip each time the direction of motion of the rider's leg is reversed.

The reaction force arises because total angular momentum is conserved. If the right and left legs reverse direction simultaneously then the vertical component of the reaction force at the rider's left hip cancels the vertical component of the reaction force at the rider's right hip and there is no net upward force on the rider's body. However, as shown in FIGS. 9A and B, in a standard bicycle drive system the rider's right and left legs may not reverse direction simultaneously. There may therefore be a net reaction force on the rider's body twice during each full revolution of the bicycle pedals. This effect is especially pronounced for long legged riders at high rates of pedal rotation.

The bouncing effect can be greatly reduced in a bicycle incorporating a drive system according to the invention. Mechanisms 21R and 21L can be configured so that right pedal 19R is past its top dead centre position when left pedal 19L reaches its bottom dead centre position (and vice versa). With this configuration the upper portions of the rider's right and left legs reverse their directions of oscillation simultaneously, or nearly so. This, in turn, reduces the bouncing effect described above.

The motion of a rider's centre of gravity fore and aft on the bicycle as the bicycle is pedalled may be less on a bicycle according to the present invention than on a bicycle equipped with a standard drive train. When a rider is standing and attempting to apply maximum torque to a standard bicycle drive train, virtually all of the rider's weight is on the forward pedal when the forward crank arm is at 90°. When both crank arms are vertical, the rider's weight acts on a line through the bottom bracket which is the portion of frame 2 in which axle 15 is mounted. Therefore, the rider's centre of gravity must move fore and aft a distance equivalent to the length of crank arms 17R, 17L twice during each full rotation of pedals 19R, 19L. Because the power strokes of pedal arms 30R, 30L in a bicycle equipped with a drive system according to the invention overlap, pedal arms 30R, 30L are not both vertical at the same time. Therefore, the rearward most point at which the rider's weight must be carried is in front of the axis of axles 33R, 33L. This reduces the distance that the rider's centre of gravity must move fore and aft and, consequently, may improve the rider's balance on the bicycle.

A linkage according to the invention may be retrofitted to a standard bicycle. However, the drive train of the invention permits some useful changes to be made to the geometry of a bicycle. In a standard bicycle drive train as shown in FIG. 1, crank arms 17R, 17L and driving sprocket 7 are affixed to the same axle 15. Axle 15 is mounted in the centre of the circle of pedal rotation. In a bicycle according to the invention, the axis of axle 15 is offset from the axis of axles 33R and 33L. Therefore, axle 15 may be located higher on the frame of a bicycle according to the invention than the centre of the circle of pedal rotation of the bicycle. Drive sprocket 7 may therefore be somewhat elevated from the position that it would have in a standard bicycle. This creates more clearance between drive sprocket 7 and the ground and thereby helps to protect sprocket 7 from rocks and mud.

Furthermore, a drive train according to the invention can be designed so that the centres of rotation of pedals 19R, 19L are farther toward the rear of a bicycle than they can be in a bicycle having a standard drive train. In a standard bicycle drive train, the centres of rotation of pedals 19R, 19L lie on axle 15. Because axle 15 runs transversely across the bicycle it must be located in front of the leading edge of rear wheel 3. Thus, the centre of rotation of pedals 19R, 19L must also lie in front of the leading edge of rear wheel 3. In a bicycle according to the invention the centre of rotation of pedals 19R, 19L may be located behind the leading edge of rear wheel 3. Rear wheel 3 may fit between axles 33R and 33L.

Figure 10A:
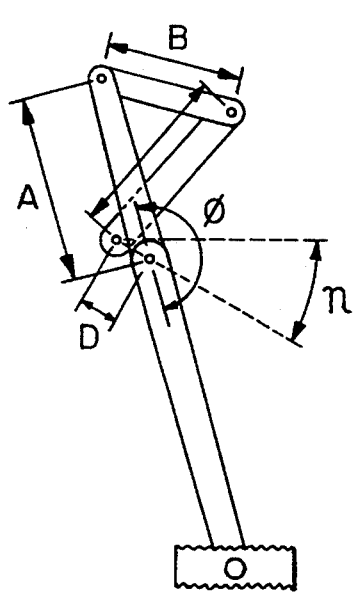
FIGS. 10A and 10B, are schematic side views of the right-hand side portion of the drive system of the bicycle of FIG. 4.
Figure 10B:
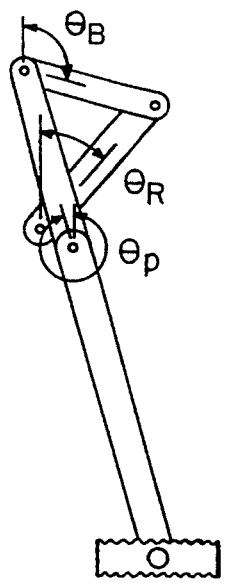

The variation in the mechanical advantage offered by mechanism 21R (or 21L) as a function of the angular position of crank arm 30R (or 30L), the amount of variation in the angle between pedal arms 30R and 30L, and the amount of overlap of the power strokes of pedal arms 30R and 30L are all functions of the geometry of mechanism 21R (and 21L). The important parameters are illustrated in FIG. 10A, which is a side elevation of mechanism 21R. These parameters are: the spacing, D, between the axis of axle 15 and the axis of axles 33R, 33L; the length A of intermediate arm 37R; the length B of connecting link 39R; the length C of crank arm 41R; the angle $\Phi$ between pedal arm 30R and intermediate arm 37R; and, the orientation of mechanism 21R as measured by the angle $\eta$ between the horizontal and a line passing through the axis of axle 15 and the axis of axle 33R. As axle 15 turns the various parts of mechanism 21R move. The configuration of mechanism 21R at any time may be specified by the angles $\theta_p$, $\theta_B$ and $\theta_R$ which are illustrated in FIG. 10B.

Many variations in the specific values of these parameters are possible without departing from the scope of the invention. It has been found that satisfactory results may be obtained when the parameters set out above have the following values:

A=8.89 cm; B=6.35 cm; C=8.13 cm; D=1.27 cm; $\Phi$=180°; and $\eta$=30°. It is important that the parameters A, B, C, and D are chosen so that mechanisms 21R, 21L turn freely and do not bind at any point during a full rotation of axle 15.

It is possible to analyze the motion of the linkage analytically using standard mathematical techniques. A generalized mathematical treatment which may be readily adapted to analyze the motion of the components of the drive mechanism of the invention may be found in many engineering text books including, for example, E. H. Martin *Kinematics and Dynamics of Machines*, McGraw-Hill, 1982. However, it is also easy to make measurements graphically.

Graphical measurements can be made for a given combination of the parameters A, B, C, D, Φ and η by drawing to scale schematic diagrams of the linkage in several different positions and measuring the relative angles of the various parts of the linkage using a protractor. It has been found, using this method, that the centres of axles 33R, and 33L should be within a circle of radius C centred on axle 15 and axle 15 should be within circles of radius A centred on axles 33L, 33R. That is, the parameters A and C must each be greater than D. B should also satisfy the following relationships:

$$B < |A+C-D|$$

$$B > D + |A-C|$$

That is, connecting link 39R should be shorter than the sum of the lengths of arms 37R and 41R minus the spacing between axles 15 and 33R. Connecting link 39R should be longer than the distance between axles 15 and 33R plus the difference in the lengths of intermediate arm 37R and crank arm 41R.

Preferably the lengths A, B, C, and D should be such that the angle between connecting link 39R and crank arm 41R and the angle between connecting link 39R and intermediate arm 37R, are never very sharp and never approach 180°. If the angle between connecting link 39R, and crank arm 41R or the angle between intermediate arm 37R and connecting link 39R is either very sharp or is significantly greater than 90° then mechanism 21R, will be subject to high internal forces when it is operated. Preferably, intermediate arm 37R, is somewhat longer than crank arm 41R and connecting link 39R is somewhat shorter than crank arm 41R. Preferably the ratio A:B is in the range of 1:0.9 to 1:0.5 and the ratio C:B is in the range of 1:10 to 5:1 and more preferably in the range 1:1 to 1:1.3. D is preferably in the range of 0.8 to 2 cm. for bicycle applications. In a standard bicycle, the lengths of pedal arms 30R, ;30L are constrained to lie in the range of approximately 16 cm to 20 cm because of the dimensions of typical riders. Preferably the ratio of pedal arm length to intermediate arm length is in the range of 1:1 to 4:1.

If we assume that $\omega_R$, the angular velocity of crank arm 41R, is constant, the angular velocity $\omega_P$ of pedal arm 30R link may be related to the angular position $\theta_R$ of crank arm 41R by either analytical or graphical methods.

Table 1 shows values of the angle $\theta_P$ and the angular velocity $\omega_P$ of intermediate arm 37R for various values of the angle $\theta_R$ of crank arm 41R. Table 1 assumes that $\omega_R$ is constant at 9.42 radians per second (90 R.P.M.) and the parameters A, B, C, D, Φ and η have the values given above. From Table 1 it can be seen that the minimum angular velocity $\omega_{Pmin}$ of pedal arm 30R, about axle 33R occurs when $\theta_P$ is approximately 5.5 radians (approximately 315°) and the maximum angular velocity $\omega_{Pmax}$ of pedal arm 30R about axle 33R, occurs when $\theta_P$ is approximately 2.0 radians (approximately 115°).

TABLE 1

| Angular velocity as a function of pedal angle | | |
|---|---|---|
| $\theta_R$ (radians) | $\theta_P$ (radians) | $\omega_P$ (radians/second) |
| 0.0 | 5.42 | 8.20 |
| 0.5 | 5.87 | 8.75 |
| 1.0 | 0.08 | 9.62 |
| 1.5 | 0.61 | 10.57 |
| 2.0 | 1.19 | 11.13 |
| 2.5 | 1.78 | 11.03 |
| 3.0 | 2.35 | 10.48 |
| 3.5 | 2.89 | 9.82 |
| 4.0 | 3.40 | 9.21 |
| 4.5 | 3.87 | 8.69 |
| 5.0 | 4.32 | 8.29 |
| 5.5 | 4.76 | 8.04 |
| 6.0 | 5.18 | 8.05 |

In designing a bicycle drive train according to the invention, the first step is to choose dimensions A, B, C, and D which will yield the desired degree of overlap between the power strokes of pedals 19R and 19L, and the desired variation in mechanical advantage throughout the cycle. When this has been done, the angular position at which the drive train offers the minimum mechanical advantage can be calculated. Finally, the position of minimum mechanical advantage may be adjusted by varying parameters Φ and η until the point of minimum mechanical advantage corresponds generally with the angular position at which the rider can exert maximum torque about axle 33R or 33L (ie. somewhere between the three o'clock and the five o'clock position depending upon whether it is desired to optimize the linkage for when the rider is sitting or standing). The parameters D and η fix the desired positions of outriggers 35R and 35L relative to axle 15.

Table 2 lists some characteristics of drive mechanisms according to the invention for various values of the parameters A, B, C, and D. The speed ratio is the ratio of maximum mechanical advantage to minimum mechanical advantage offered by the linkage. The gap is the difference in the angle of intermediate arm 37R between the point where mechanism 21R offers its maximum mechanical advantage and the point where mechanism 21R offers its minimum mechanical advantage.

TABLE 2

| Mechanism Characteristics | | | | | |
|---|---|---|---|---|---|
| A (cm) | B (cm) | C (cm) | D (cm) | Speed Ratio | Gap (radians) |
| 6.03 | 5.72 | 5.72 | 1.42 | 1.79:1 | 2.54 |
| 6.03 | 5.72 | 5.72 | .97 | 1.47:1 | 2.75 |
| 6.03 | 5.72 | 5.72 | .79 | 1.37:1 | 2.8 |
| 6.03 | 6.03 | 5.72 | .97 | 1.48:1 | 2.75 |
| 6.03 | 5.08 | 5.72 | .97 | 1.45:1 | 2.71 |
| 6.03 | 5.72 | 5.08 | .97 | 1.52:1 | 2.71 |
| 6.03 | 5.72 | 6.35 | .97 | 1.43:1 | 2.73 |
| 5.72 | 5.72 | 5.72 | .97 | 1.49:1 | 2.69 |
| 6.35 | 6.35 | 5.08 | 1.02 | 1.56:1 | 2.74 |
| 6.35 | 6.35 | 5.08 | .76 | 1.39:1 | 2.8 |
| 6.35 | 6.35 | 5.08 | .89 | 1.48:1 | 2.76 |
| 6.35 | 6.35 | 5.08 | .93 | 1.50:1 | 2.76 |
| 6.35 | 6.35 | 5.08 | .91 | 1.49:1 | 2.76 |
| 6.99 | 6.99 | 4.45 | .89 | 1.54:1 | 2.75 |
| 6.99 | 6.99 | 4.45 | .76 | 1.44:1 | 2.73 |
| 6.99 | 6.99 | 4.45 | .84 | 1.50:1 | 2.75 |
| 6.99 | 6.99 | 4.45 | .81 | 1.48:1 | 2.75 |
| 4.45 | 6.99 | 6.99 | .81 | 1.48:1 | 2.82 |
| 5.72 | 5.72 | 5.72 | .95 | 1.48:1 | 2.75 |
| 4.45 | 6.99 | 6.99 | .71 | 1.41:1 | 2.85 |
| 5.08 | 6.99 | 6.99 | .71 | 1.35:1 | 2.74 |

FIG. 11 is a graph showing the relationship between $\theta_R$ and $\omega_P$ for the various values of the parameters A, B, C, and D listed in Table 3. In FIG. 11, Φ is fixed at 180° and η is fixed at 0°. It can be seen from FIG. 11 that the angles at which $\omega p$ is maximum and minimum and the maximum and minimum values of cop can be adjusted by changing the parameters A, B, C, and D.

TABLE 3

| Curve | Parameter values for FIG. 11 | | | |
| --- | --- | --- | --- | --- |
| | A (mm) | B (mm) | C (mm) | D (mm) |
| Q | 50 | 50 | 50 | 10 |
| R | 50 | 50 | 50 | 40 |
| S | 50 | 12 | 50 | 10 |
| T | 10 | 47.5 | 50 | 5 |
| U | 50 | 80 | 50 | 10 |

Figure 12A:
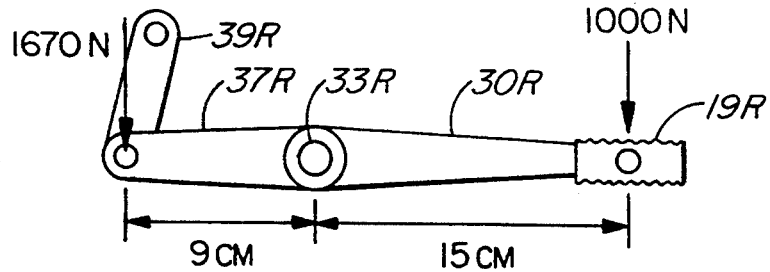
FIGS. 12A and 12B are schematic diagrams illustrating how torque may arise about the outrigger bearings of the drive system of the bicycle of FIG. 4.
Figure 12B:
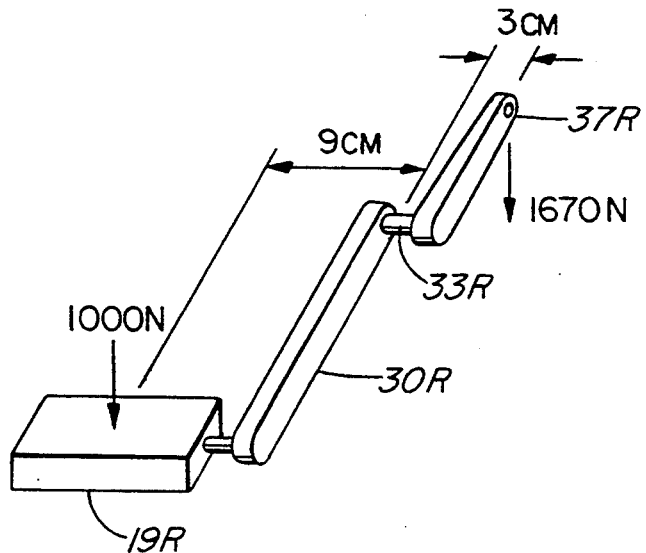

Preferably Φ is 180°. When pedal arm 30R extends in a direction opposite to intermediate arm 37R the twisting moment on bearing 34R is reduced. This can be seen with reference to FIGS. 12A and 12B. FIG. 12 is a schematic diagram showing the forces on pedal arm 30R, and intermediate arm 37R. As shown in FIG. 12B, these forces create a twisting moment about the centre of bearing 34R. In FIG. 12A, pedal arm 30R, is 15 centimetres long and intermediate arm 37R is 9 centimetres long. At equilibrium, if the rider exerts a 1000N force on the end of arm 30R, that force must be balanced by a corresponding force applied at the end of intermediate arm 37R. In this case, the corresponding force must be 1670N. If the rider exerts force at a point 9 centimetres outward from the centre of bearing 34R and this force is balanced by a force which is applied to intermediate arm 37R at a point 3 centimetres inward from bearing 34R. The result is a net torque of 400N·m acting to twist bearing 34R outwardly. If angle Φ was not 180°, the torque on bearing 34R would be larger. As noted above, it may be desirable in some configurations for Φ to be different from 180°. Changing Φ is an easy way to adjust the angle of pedal arm 30R so that it is in a preferred position when mechanism 21R offers the least mechanical advantage.

Outriggers 35R, 35L may be constructed to permit adjustment of the distance between the axes of axles 33R, 33L and the axis of axle 15. Any structure used to hold axles 33R, 33L in place must be robust because relatively large forces are applied to axles 33R, 33L. For example, as shown in FIG. 13, bearing 34R may be mounted in a housing 32R. Housing 32R attaches with bolts 31 to serrated plate 38R. Bolts 31 pass through plate 38R and through slots in a serrated plate 36R at the end of outrigger 35R. The serrations on plate 36R inter-fit with the serrations on plate 38R. The positions of housing 32R or 32L can be adjusted by loosening the bolts that hold housing 32R in place and sliding housing 32R to a new position where the serrations on plate 36R once again inter-fit with the serrations on plate 38R. A similar mechanism can be provided on the left hand side of the bicycle. In typical configurations, a range of motion of approximately 3 cm is adequate to provide adequate adjustment to the speed ratio of the mechanism.

Figure 18:
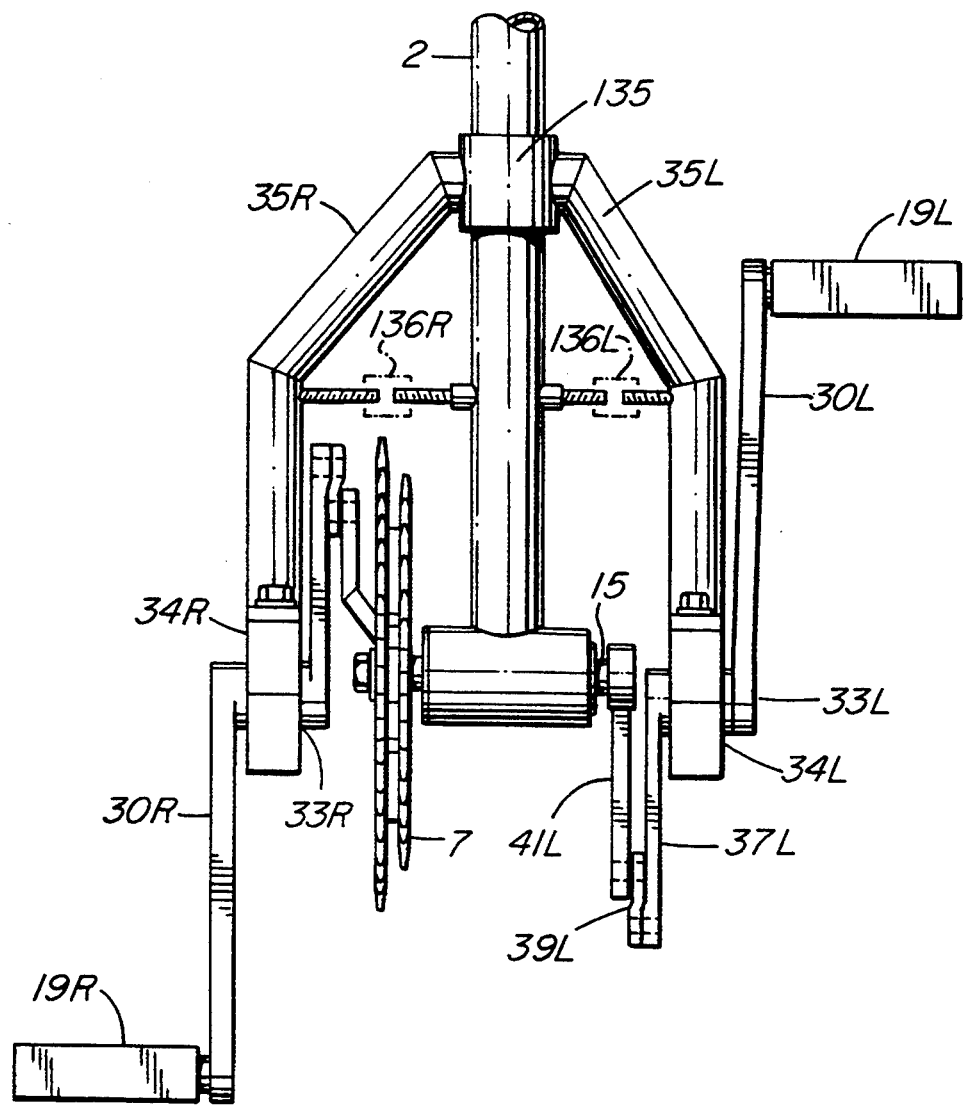

Other means for adjusting the positions of axles 33R, 33L are possible. For example, as shown in FIG. 18, outriggers 35R, 35L may be the arms of a "∩"-shaped member pivotally attached at its uppermost point to frame 2 by a pivot 135. Locking means, such as turnbuckles shown schematically as 136R, 36L connected between frame 2 and outriggers 35R, 35L may then provided to lock outriggers 35R, 35L in place with any desired spacing between axle 15 and axles 33R, 33L. In the alternative, outriggers 35R, 35L may be the arms of a member which is bolted to frame 2. The spacing between axle 15 and axles 33R, 33L can then be adjusted by inserting spacers between frame 2 and outriggers 35R, 35L and firmly fastening the bolts connecting outriggers 35R, 35L to frame 2.

As the mechanical characteristics of drive assemblies 21R, 21L depend, in part, upon the spacing between axle 15 and axles 33R, 33L the characteristics of drive mechanisms 21R, 21L may be adjusted by pivoting or otherwise moving outriggers 35R, 35L so that the centres of axles 33R, 33L move either toward or away from the centre of axle 15. When the centres of axles 33R, 33L are aligned with the centre of axle 15, then drive mechanisms 21R, 21L offer no mechanical advantage and behave in the same way as a standard bicycle drive train. As the spacing between the centre of axle 15 and the centres of axles 33R, 33L is increased, the overlap in the power stroke between pedals 19R and 19L increases, the variation in mechanical advantage throughout the cycle of each pedal also increases.

As shown in FIG. 14, mechanisms 21R, 21L may be constructed so that connecting links 39R, 39L operate in tension (as opposed to operating in compression). As shown in FIG. 14, when connecting links 39R, 39L operate in tension, intermediate arms 37R, 37L do not cross crank arms 41R, 41L when connecting links 39R, 39L are in the uppermost portion of their trajectories. As shown in FIG. 7, when connecting links 39R, 39L operate in compression, intermediate arms 37R, 37L cross crank arms 41R, 41L when connecting links 39R, 39L are in the uppermost portion of their respective trajectories.

It is generally preferable that connecting links 39R, 39L, operate in compression. When connecting links 39R, 39L operate in tension the variation in mechanical advantage is such that pedals 19R and 19L tend to decelerate quickly near their top dead centre positions. That is, the rotation rate of pedals 19R, 19L is maximum near the top of the pedals swings. When connecting links 39R, 39L operate in compression, the maximum velocity of pedals 19R, 19L occurs earlier in the upswing. Operating connecting links 39R, 39L in compression helps to avoid sudden changes in the rider's thigh velocity near the pedals' top dead centre position.

Figure 15A:
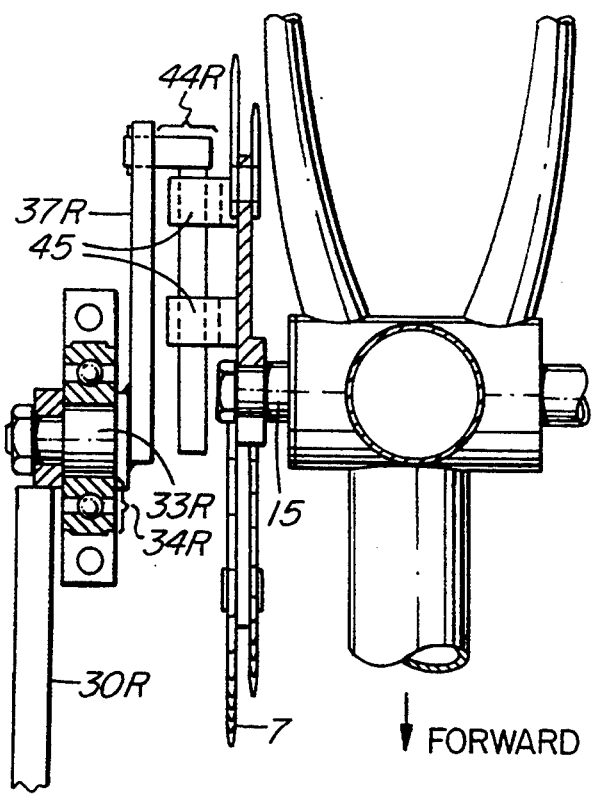
FIGS. 15A and B, are a plan view and an elevation of the right-hand side portion of a second alternative construction for a drive system according to the invention.
Figure 15B:
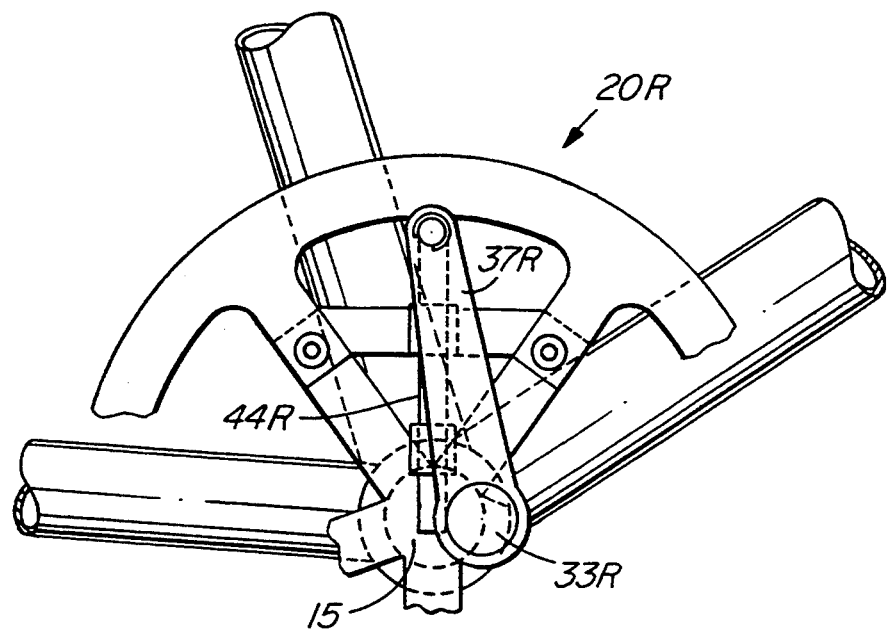

FIGS. 15A and B show an alternative embodiment of the invention. In the mechanism 20R, connecting link 39R and crank arm (as shown in FIG. 5) have been replaced with telescopic crank arm 44R which is connected at a first end to axle 15 and at a second end to intermediate arm 37R. Telescopic crank arm 44R may be a shaft slidably engaged in bushings 45 mounted to sprocket 7.

The operation of mechanism 20R is similar to the operation of mechanism 21R described above. As above, a left-hand mechanism (not shown) can be provided for operation by the rider's left foot. As axle rotates, intermediate arm 37R applies a force to the second end of telescopic crank arm 44R. The force on the end of telescopic crank arm 44R causes a torque on axle 15 and causes axle 15 to rotate. Because axle 33R and axle 15 are not concentric, the distance between the end of intermediate arm 37R and the centre of axle 15 changes as axle 33R rotates. Telescopic crank arm 44R extends and contracts to accommodate these changes.

The mechanical advantage of mechanism 20R varies with the angle of rotation of axle 33R. The mechanical advantage is maximum when telescopic crank arm 44R is fully extended (i.e. when intermediate arm 37R is pointing away from axle 15). The mechanical advantage of mechanism 20R is minimum when telescopic crank arm 44R is fully contracted (i.e. when intermediate arm 37R is pointing toward axle 15).

Figure 16:
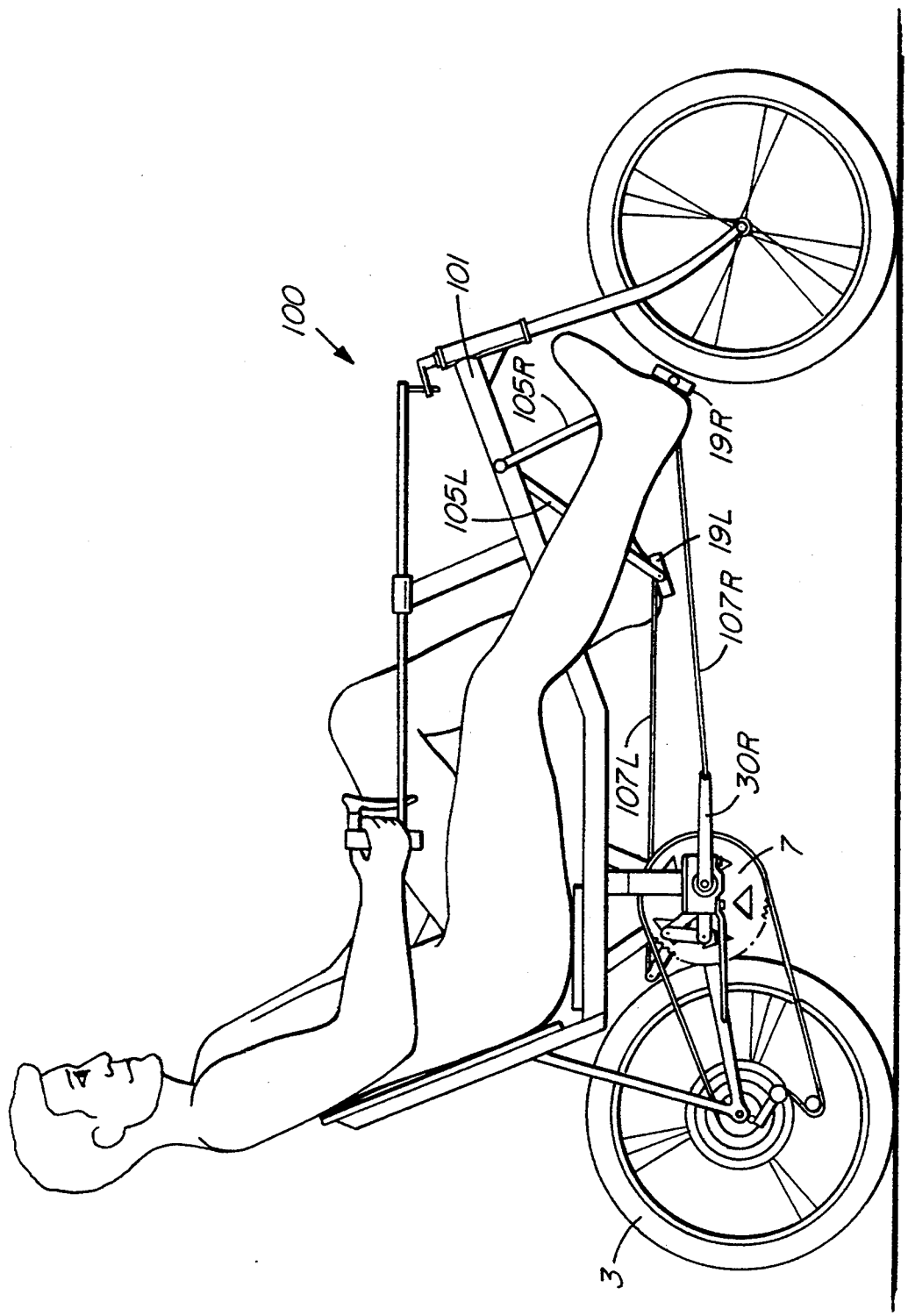
FIG. 16 is a side elevation of a recumbent bicycle incorporating a pendulum pedal action and a drive train according to the invention.

It is not necessary that pedal assemblies 19R, 19L, be attached directly to arms 30R, 30L The advantages of a drive mechanism according to the invention can be achieved with other linkages for applying the force applied by a rider to arms 30R, 30L. For example, FIG. 16 shows a recumbent bicycle which utilizes a drive mechanism according to the invention. Recumbent bicycle 100 has a frame 101. Rear wheel 3 of recumbent bicycle 100 is driven by a sprocket 7 in a conventional manner. Sprocket 7 is driven by a pair of mechanisms 21R, 21L according to the invention. A rider drives recumbent bicycle 100 by alternately pressing on pedals 19R, 19L.

Pendulum arms 105R, 105L are pivotally mounted to frame 101 so that they can swing fore and aft relative to frame 101. Pedals 19R, and 19L are attached at the extreme ends of pendulum arms 105R, 105L. Pendulum arm 105R is connected to arm 30R by a transfer rod 107R which is pivotally connected at one end to pendulum arm 105R and is pivotally connected at it's other end to pedal arm 30R. Pendulum arm 105L is similarly connected to pedal arm 30L by transfer rod 107L. The overlap in power strokes between assembly 21R and assembly 21L is particularly useful in this configuration because, as discussed above, there is no stall position. That is, as long as assemblies 21R and 21L are aligned so that pedal arms 30R and 30L are not both horizontal when they are aligned with transfer rods 107R and 107L there is no position during which both of pedal arms 30R and 30L are in alignment with the driving forces transmitted through transfer rods 107R and 107L.

The recumbent bicycle shown in FIG. 16 has several advantages over a recumbent bicycle with a standard drive train. Firstly, the chain can be kept short because motion of the rider's feet is transferred to the drive mechanism by the transfer rods 107R, 107L. Secondly, the pedalling motion is more efficient than a pedalling motion in which the rider's legs move in a circle because there is less vertical motion of the rider's legs. Finally, the reduced vertical foot and leg movement allows the frontal area of the recumbent bicycle to be kept small to reduce wind drag.

Figure 17:
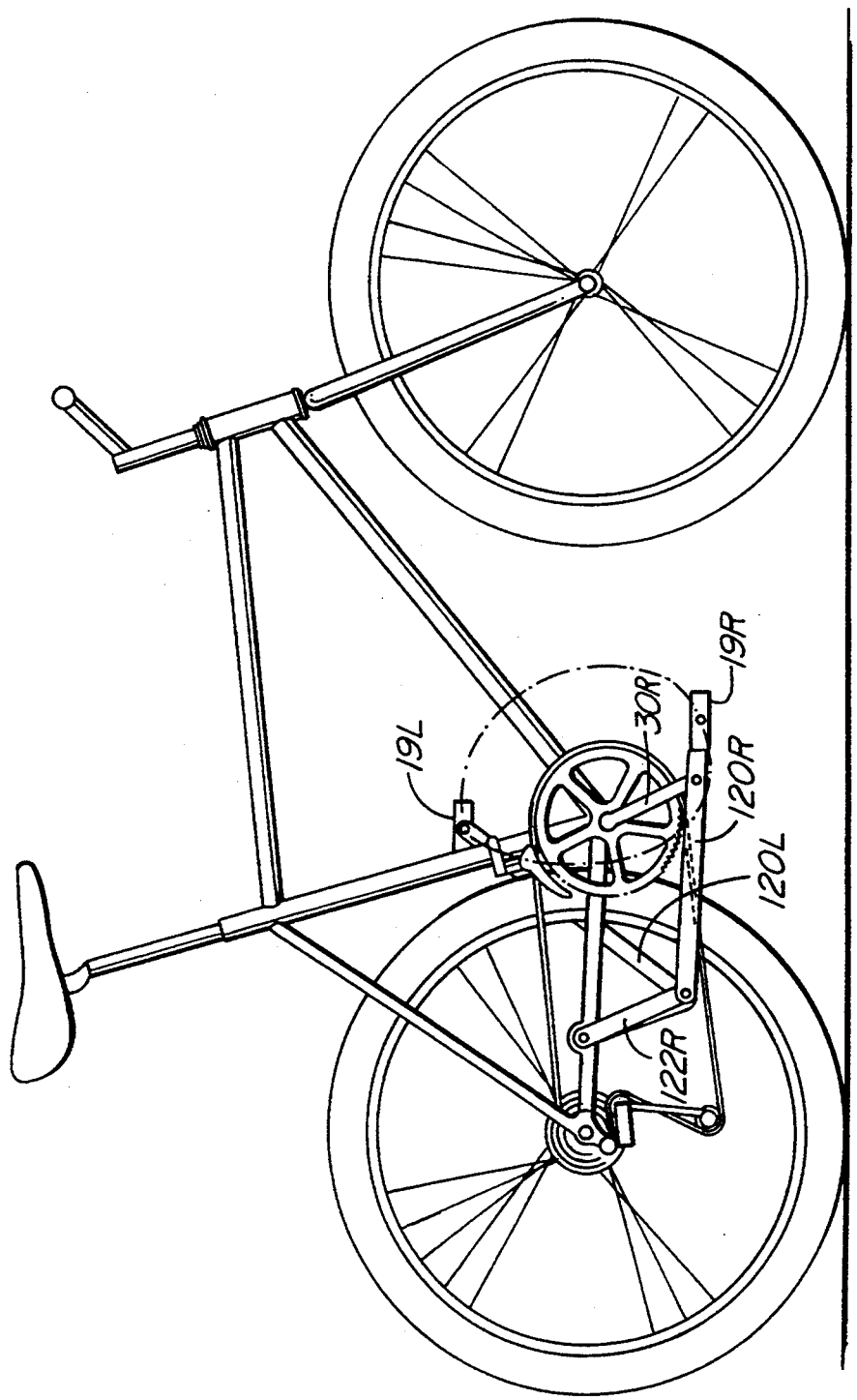
FIG. 17 is an alternative embodiment of the invention incorporating a linkage to alter the path of the pedals; and, FIG. 18 is a partially cut away front view of a bicycle equipped with an alternative embodiment of the invention comprising a single piece outrigger assembly.

FIG. 17 shows an alternative drive mechanism for a bicycle which may be used with the invention. In FIG. 17, mechanisms 21R and 21L have been omitted for greater clarity. Pedal 19R is mounted at one end of a beam 120R. The second end of beam 120R is pivotally connected to the frame 2 of bicycle 1 by means of link 122R. One end of link 122R is pivotally mounted to frame 2. The other end of link 122R is pivotally mounted to the second end of beam 120R. Beam 120R is pivotally mounted to arm 30R at a point between pedal 19R and link 122R but toward pedal 19R. Pedal 19L is similarly mounted to a beam 120L and a link 122L. With the embodiment of the invention shown in FIG. 17, pedals 19R and 19L travel in non-circular paths. This further enhances the action of the drive mechanism of the invention because it makes the distance that the rider's feet have to travel during the return portion of the cycle shorter than the distance that the rider's feet must travel during the power stroke of the cycle. Therefore, it makes the rider's foot speed more nearly constant throughout the cycle then would be the case if pedals 19R, 19L were attached directly to arms 30R, 30L.

As an alternative to using link 122R as a means of coupling beam 120R to frame 2, beam 120R may be coupled directly to frame 2. If beam 120R is coupled directly to frame 2 then beam 120R must be slideably and pivotally coupled to frame 2. Because beam 120R is pivotally connected to pedal arm 30R, beam 120R must be free to move forward and rearward relative to frame 2 as pedal arm 30R turns with right axle 33R.

With the bicycle shown in FIG. 17, the rider's foot follows a generally circular path from the twelve o'clock position to the five o'clock position. The speed and mechanical advantage increases from 0.8 to 1.0 at the two o'clock point and then decreases to 0.7 at the five o'clock point. This amplifies the torque peak during the power stroke. The return path is more direct. The length of the path traced by pedals 19R, 19L in one cycle is reduced by 14% over the length of the circular path that pedals 19R, 19L would travel if attached directly to pedal arms 30R, 30L. The linkage also helps to shift the rider's centre of gravity forward relative to the bicycle.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A drive mechanism (21R, 21L) for imparting rotational motion to a drive axle (15) rotatably coupled to a frame (2), said mechanism comprising:
   (a) right and left axles (33R, 33L) rotatably coupled to said frame (2), parallel to said drive axle;
   (b) right and left pedal arms (30R, 30L) connected transversely to said right and left axles respectively, said right and left pedal arms rotatable through a full circle about said right and left axles respectively;
   (c) right and left intermediate arms (37R, 37L) connected transversely to said right and left axles respectively, at an angle $\phi$ relative to said right and left pedal arms respectively; and
   (d) right and left linkage means connected between said intermediate arms and said drive axle wherein said left and right linkage means comprise right and left crank arms (41R, 41L) connected transversely to said drive axle; and, substantially rigid right and left connecting links (39R, 39L), said connecting links each having a first end pivotally connected to said respective intermediate arm and a second end pivotally connected to said respective crank arm.

2. The drive mechanism of claim 1 wherein said right and left crank arms do not cross said right and left intermediate arms respectively when said right and left connecting links are uppermost in their trajectories.

3. The drive mechanism of claim 1 wherein said left connecting link is longer than the distance between said drive axle and said left axle and said right connecting link is longer than the distance between said drive axle and said right axle.

4. The drive mechanism of claim 1 wherein said left and right connecting links are not longer than either of said left and right intermediate arms respectively.

5. The drive mechanism of claim 4 wherein said left and right intermediate arms are longer than said left and right crank arms respectively.

6. The drive mechanism of claim 5 wherein the ratios of the length of said left and right intermediate arms to the length of said left and right connecting links are respectively in the range of 1:0.8 to 1:0.5.

7. The drive mechanism of claim 1 wherein the ratio of the lengths of said right and left crank arms to the lengths of said right and left intermediate arms is in the range of 1:10 to 5:1.

8. The drive mechanism of claim 7 wherein the ratio of the lengths of said right and left crank arms to the lengths of said right and left intermediate arms is in the range of 1:1 to 1:1.3.

9. The drive mechanism of claim 1 wherein $\phi$ is in the range of 140° to 220°.

10. The drive mechanism of claim 9 wherein $\phi$ is 180°.

11. The drive mechanism of claim 9 further comprising left and right foot pedals projecting outwardly from ends of said left and right pedal arms respectively away from said left and right axles.

12. The drive mechanism of claim 9 wherein the length ratios of said right and left pedal arms to said right and left intermediate arms respectively is in the range of 1:1 to 4:1.

13. The drive mechanism of claim 12 wherein said right and left pedal arms have lengths in the range of 160 mm to 200 mm.

14. The drive mechanism of claim 1 wherein said frame has a forward end and a rearward end and further comprising left and right lever arms pivotally mounted to said frame for swinging forward and rearward relative to said frame, left and right foot pedals connected to said left and right lever arms at points spaced, apart from said frame and left and right connecting arms pivotally connected between said left and right lever arms and said left and right pedal arms.

15. The drive mechanism of claim 1 wherein said frame has a forward end and a rearward end and further comprising right and left beams (120R, 120L) having first ends coupled to said frame at points behind said driving axle and left and right foot pedals extending outwardly from second ends of said left and right beams, wherein said left and right beams are pivotally connected to said left and right pedal arms respectively at points between said first and second ends of said left and right lever arms.

16. The drive mechanism of claim 15 wherein said first ends of said left and right beams are coupled to said frame by left and right rigid links (122R, 122L) pivotally connected between said frame and said left and right beams.

17. The drive mechanism of claim 15 wherein said first ends of said left and right beams are slideably coupled to said frame.

18. The drive mechanism of claim 1 wherein said driving axle has an axis, said left and right axles share a common axis, and said axis of said driving axle is spaced apart from said common axis of said left and right axles by a distance in the range of 0.8 cm to 2.0 cm.

19. The drive mechanism of claim 1 wherein said driving axle has an axis, said left and right axles share a common axis, and said common axis is forward in said frame from said driving axle axis.

20. The drive mechanism of claim 19 wherein said common axis is below said driving axle axis.

21. The drive mechanism of claim 20 wherein a line drawn in a vertical plane between said driving axle axis and said common axis forms an angle in the range of 0° to 40° with the horizontal.

22. The drive mechanism of claim 1 wherein said driving axle has an axis, said left and right axles share a common axis, and said common axis is below said driving axle axis.

23. The drive mechanism of claim 1 wherein said left and right axles are journalled for rotation in left and right outriggers connected to said frame, said left and right axles are movable relative to said frame for varying the distances between said driving axle and said left and right axles and further comprising locking means for locking said left and right axles in place with respect to said frame.

24. A drive mechanism (21R, 21L) for imparting rotational motion to a drive axle (15) rotatably coupled to a frame (2), said mechanism comprising:
   (a) right and left axles (33R, 33L) rotatably coupled to said frame (2), parallel to said drive axle;
   (b) right and left pedal arms (30R, 30L) connected transversely to said right and left axles respectively;
   (c) right and left intermediate arms (37R, 37L) connected transversely to said right and left axles respectively, at an angle $\phi$ relative to said right and left pedal arms respectively; and
   (d) right and left linkage means connected between said intermediate arms and said drive axle wherein said left and right linkage means comprise right and left crank arms (41R, 41L) connected transversely to said drive axle and, right and left connecting links (39R, 39L) pivotally connected between said respective intermediate arms and crank arms and wherein said right and left crank arms cross said right and left intermediate arms respectively when said right and left connecting links are uppermost in their trajectories.

25. A drive mechanism (21R, 21L) for imparting rotational motion to a drive axle (15) rotatably coupled to a frame (2), said mechanism comprising:
   (a) right and left axles (33R, 33L) rotatably coupled to said frame (2), parallel to said drive axle;
   (b) right and left pedal arms (30R, 30L) connected transversely to said right and left axles respectively;
   (c) right and left intermediate arms (37R, 37L) connected transversely to said right and left axles respectively at an angle $\phi$ relative to said right and left pedal arms respectively; and
   (d) right and left linkage means connected between said intermediate arms and said drive axle wherein said left and right axles are journalled for rotation in left and right outriggers connected to said frame, said left and right axles are movable relative to said frame for varying the distances between said driving axle and said left and right axles and further comprising locking means for locking said left and right axles in place with respect to said frame and, wherein said left and right outriggers are two ends of an outrigger member pivotally connected to said frame near its midpoint, said left and right axles are journalled for rotation near the ends of said left and right outriggers, and said locking means locks said outrigger member with respect to said frame.

26. A drive mechanism (21R, 21L) for imparting rotational motion to a drive axle (15) rotatably coupled to a frame (2), said mechanism comprising:
(a) right and left axles (33R, 33L) rotatably coupled to said frame (2), parallel to said drive axle;
(b) right and left pedal arms (30R, 30L) connected transversely to said right and left axles respectively;
(c) right and left intermediate arms (37R, 37L) connected transversely to said right and left axles respectively, at an angle $\phi$ relative to said right and left pedal arms respectively; and
(d) right and left linkage means connected between said intermediate arms and said drive axle wherein said left and right axles are journalled for rotation in left and right outriggers connected to said frame, said left and right axles are movable relative to said frame for varying the distances between said driving axle and said left and right axles and further comprising locking means for locking said left and right axles in place with respect to said frame and, wherein said outriggers each comprise a first member connected to said frame; a first plate connected to said first member; a second plate in sliding contact with said first plate; bearing means rotatably mounting said left and right axles respectively to said second plate; fastening means for clamping said first plate to said second plate; and gripping surfaces on said first and second plates for preventing said first plate from sliding with respect to said second plate when said fastening means are engaged.

27. The drive mechanism of claim 26 wherein said gripping surfaces comprise mating serrations on adjoining faces of said first and second plates.

28. A drive mechanism for deriving rotational motion from human power, said drive mechanism comprising:
(a) a frame having a forward end, a rearward end, an upper side, a lower side, a left side and a right side;
(b) a first transverse driving axle having an axis, a left end and a right end journalled for rotation in said frame;
(c) a left crank arm connected to and extending radially away from said left end of said first axle;
(d) a right crank arm connected to and extending radially away from said right end of said first axle in a direction opposite to said left crank arm;
(e) left and right axles each having a left end, a right end and an axis, and each being journalled for rotation relative to said frame and spaced apart from said first axle;
(f) a left intermediate arm connected to and extending radially from said right end of said left axle said left intermediate arm rotatable with said left axle through a full circle about an axis of said left axle;
(g) a right intermediate arm connected to and extending radially from said left end of said right axle said right intermediate arm rotatable with said right axle through a full circle about an axis of said right axle;
(h) a left connecting link pivotally attached to said left crank arm at a point spaced apart from said first axle and pivotally attached to said left intermediate arm at a point spaced apart from said left axle;
(i) a right connecting link pivotally attached to said right crank arm at a point spaced apart from said first axle and pivotally attached to said right intermediate arm at a point spaced apart from said right axle;
(j) a left pedal arm connected to and extending radially from said left end of said left axle said left pedal arm rotatable with said left axle through a full circle about said axis of said left axle; and
(k) a right pedal arm connected to and extending radially from said right end of said right axle said right pedal arm rotatable with said right axle through a full circle about said axis of said right axle.

29. The drive mechanism of claim 28 wherein the angle between said right and left pedal arms is less than 180° over a range of angular motion of said right and left pedal arms and said left and right pedal arms are simultaneously forward from said left and right axles respectively over at least a portion of said range of angular motion.

* * * * *